US007666498B2

(12) United States Patent
Collins et al.

(10) Patent No.: US 7,666,498 B2
(45) Date of Patent: Feb. 23, 2010

(54) PRINT METHODOLOGY FOR APPLYING POLYMER MATERIALS TO ROOFING MATERIALS TO FORM NAIL TABS OR REINFORCING STRIPS

(76) Inventors: David Allan Collins, 11302 Memorial Dr., Houston, TX (US) 77024; George William Jackson, 3100 Walnut Bend, #222, Houston, TX (US) 77042; Miguel E. Madero O'Brien, Sierra Amatepec 371, Lomas de Chapultepec, Mexico, D.F. (MX) 11000

( * ) Notice: Subject to any disclaimer, the term of this patent is extended or adjusted under 35 U.S.C. 154(b) by 369 days.

(21) Appl. No.: 11/475,455

(22) Filed: Jun. 27, 2006

(65) Prior Publication Data

US 2006/0240230 A1 Oct. 26, 2006

Related U.S. Application Data

(62) Division of application No. 10/855,264, filed on May 27, 2004, now Pat. No. 7,201,946.

(60) Provisional application No. 60/474,194, filed on May 29, 2003, provisional application No. 60/485,774, filed on Jul. 9, 2003.

(51) Int. Cl.
*B32B 7/12* (2006.01)

(52) U.S. Cl. ......................... 428/343; 428/98; 428/141; 428/172; 428/195.1; 428/201; 428/213; 428/214; 428/345; 428/346; 427/186; 427/187; 427/188; 427/428.18; 427/428.19; 427/428.2; 52/746.11

(58) Field of Classification Search .............. 52/746.11; 427/186–188, 428.18–428.2; 428/141, 98, 428/172, 195.1, 201, 213–214, 343, 345–346
See application file for complete search history.

(56) References Cited

U.S. PATENT DOCUMENTS

| | | | | |
|---|---|---|---|---|
| 3,003,906 | A * | 10/1961 | Fasold et al. | 156/269 |
| 6,210,757 | B1 * | 4/2001 | Taylor et al. | 427/356 |
| 2003/0044526 | A1 * | 3/2003 | Lassiter | 427/186 |
| 2003/0215594 | A1 * | 11/2003 | Hamdar et al. | 428/40.1 |

FOREIGN PATENT DOCUMENTS

WO WO97/29256 * 8/1997

* cited by examiner

*Primary Examiner*—David R Sample
*Assistant Examiner*—Prashant J Khatri

(57) ABSTRACT

A method of making a composite roofing material and the resulting material by depositing nail tabs made of a thermoplastic, thermosetting, adhesive or elastomer material, in a liquid state, onto the base substrate of the composite roofing material or onto the saturated or coated roofing material, or onto a transfer surface to be pressed or laminated onto the roofing material. A preferred embodiment transfers the nail tabs onto an engraved transfer impression roll and uses a pressurized applicator to inject the viscous tab material into engraved patterns depressed in raised areas of the impression roll., then deposits the material onto the roofing material. A preferred embodiment also includes the thermoplastic or thermosetting material in a liquid or viscous state hardened or cured by either its exposure to the air or by the use of ultraviolet or visible light.

7 Claims, 10 Drawing Sheets

PRINT METHODOLOGY FOR APPLYING POLYMER MATERIALS TO ROOFING MATERIALS TO FORM NAIL TABS OR REINFORCING STRIPS

CROSS REFERENCE TO RELATED APPLICATIONS

This application is a divisional application from application Ser. No. 10/855,264 filed May 27, 2004 now U.S. Pat. No. 7,201,946 and is related to the following U.S. patent applications:

provisional patent application No. 60/474,194 titled Machine and Method for Applying Thermoplastics and Adhesives To Roofing Materials with Nail Tabs filed May 29, 2003 and provisional patent application No. 60/485,774 titled Machine and Method for Applying Thermoplastics and Adhesives To Roofing Materials with Nail Tabs filed Jul. 9, 2003, which are hereby incorporated by reference as if fully set forth herein.

STATEMENT REGARDING FEDERALLY SPONSORED RESEARCH OR DEVELOPMENT

Not applicable

BACKGROUND OF THE INVENTION

The invention relates generally to roofing materials or other building materials normally employed as cover materials over a wood roof deck or stud wall and more specifically to such cover materials and methods for incorporating therein a plurality of integrally formed nail tabs or a continuous reinforcing strip.

The Typical Roof Composition.

A roof installation generally comprises at least two distinctive layers applied over a roof deck with each layer being comprised of a separate roofing material. The first layer is an underlayment, usually a substantially asphalt saturated substrate material that attaches directly to the roof deck, oftentimes a wood frame of wood studs and plywood sheets or board material. The second layer is made up of the shingles, rolled roofing, wood shakes, and metal or tile roof coverings themselves. The shingles and rolled roofing are substantially made from a fiberglass or other inorganic fibrous material coated with a substantially asphalt or asphalt-mix coating, stone granules and other materials. Specific materials, layers of materials and actual application methods differ by manufacturer and type of building application. Normally, the underlayment assists in making the roof resistant to water intrusion.

The Typical Underlayment Substrate.

The underlayment is usually an asphalt saturated substrate. The starting material for the underlayment, or the substrate material itself, is a base composite material usually referred to as “dry felt” or “organic felt”, but the substrate material could also be a fiberglass mat or other inorganic material mat or a hybrid of both. Examples of types of dry felt starting material are rag, paper, wood sawdust and could include fiberglass or other inorganic material, oftentimes in a fibrous state, although other suitable starting base materials may be employed. The starting base material, in a preferred embodiment, is a fibrous paper called dry felt made from treating recyclable cardboard, mixed recycled papers and wood sawdust or a fibrous mat made from inorganic materials chemically or mechanically formed into a fibrous state; however, this invention is not limited thereto. The term “substrate” used herein is used generically for all suitable starting base material including dry felt, fiberglass mat and polyester mat or any other base material on which a composite roofing or building material is built upon. Dry felt, when saturated with an asphalt-based material, produces an underlayment roofing material known in the trade as “tar paper” or “saturated felt,” which is produced in various grades depending upon thickness and weight. Fiberglass mat and polyester mat when coated with an asphalt, rubber-asphalt or asphalt-mix material produce the base substrate for shingles and other residential and commercial rolled roofing products.

The Underlayment Installation.

Regardless of the type of underlayment roofing material that has been employed, common practice in the installation industry has been to unroll a length of the underlayment material and affix each length to the roof deck or building sides support sheets or boards at a plurality of locations so that it stays in place prior to the installation of the covering shingles. The affixing or fastening devices for this material are generally staples and nails. Staples and nails are readily applied by power devices; however, both are notoriously susceptible to either pulling out of the sheets or boards when there is uplift on the underlayment or, when the staples or nails stay in place, tearing of the roofing material at the fastening locations. Even when shingling is to follow immediately, the underlayment can still be exposed alone to windy and other adverse conditions, such as when the installers walk or crawl on the underlayment.

Moreover, it is desirable that the underlayment be securely attached independently of the shingles, wood shakes, metal tile or other roof covering not only in the pre-shingling or pre-roof covering stage of installation, but also in the final installation. This is because shingles or other roof coverings do get damaged, blown or ripped off the roof under adverse weather conditions and a secure independently installed underlayment will provide some interim protection from the weather elements prior to roof repair. When the underlayment is not securely fastened, then the underlayment may be blown away or ripped concurrently with shingle damage.

Current Underlayment Installation Practice Using Washers.

To securely install the underlayment and avoid the tearing described above, it has long been a common practice to either use roofing nails with large heads or to use an auxiliary large washer or tab that lies underneath the nail head. Such large washer or tab successfully resists being torn through as with a smaller nail head of regular size. The use of such washer or tab has not been totally satisfactory, however, since such use is time consuming, somewhat expensive, and can be somewhat dangerous when the installation is on a fairly steeply pitched roof and/or the conditions are inclement. This is because it requires two hands to either slip the washer over the nail or to hold a tab down while driving the nail through. If the installer has to reach while only supporting himself or herself on a toe board, it may be uncomfortable and/or unstable to be unable to use either hand for additional support when necessary. Moreover, nails with large, unconventional heads are not recommended both because they are expensive and because they cannot be used in ordinary power equipment. Ordinarily, power equipment for driving nails can be loaded only with standard nail cartridges.

It is an advantage of the present invention to provide a gravure printing or offset printing process for the application of polymer nail tabs or continuous strips to underlayment or other roofing material.

It is another advantage of the present invention to provide a lamination process for the deposition of polymer material to form nail tab or continuous strips on underlayment or other roofing material.

It is yet another advantage of the present invention to provide an underlayment or other roofing material with a plurality of nail tabs or continuous reinforcement strips applied through a gravure or other printing process.

It is still yet another advantage of the present invention to provide a method for applying polymer material through a pressurized delivery system in a gravure or other printing process.

It is another advantage of the present invention to provide a system for depositing a plurality of generally rounded tabs to underlayment or other roofing material using an etched pattern or an open pattern, with no cell walls or other points of interruption within the pattern.

It is another advantage of the present invention to provide a system for depositing a line of polymer material onto underlayment, or any other roofing material.

BRIEF SUMMARY OF THE INVENTION

The invention is to the print method, a gravure, rotogravure or gravure-like transfer printing (the "gravure process") or offset printing, of an appropriately viscous and substantially polymeric material onto roofing material, or onto a continuous transfer material and then transferred, including utilizing a laminating process, onto the roofing material, in a continuous process. The gravure process employs a print cylinder which has etched or engraved cells of varying depth, width and shape and which cells can be varied to apply differing amounts of tab material as a means of controlling the pattern and other attributes of the resultant nail tab.

A composite roofing material includes a final condition underlayment, roll roofing or shingle material having bonded thereto appropriate rows of nail tabs or continuous reinforcing strips preferably made of, either in total or in part, a polymer material, including but not limited to an adhesive or plastic-based material, including thermo-plastic, thermo-setting, hot-melt adhesive, elastomer or ultra-violet light curing materials, and can include materials of contrasting color to the roofing material or any other materials which tailor the primary polymeric material's properties.

The material used or applied in the print methodologies described herein, to form nail tabs or continuous reinforcing strips on the roofing materials, are substantially polymer materials (the term "tab material" is used herein to describe these materials). The polymer materials specifically include, but are not limited to, thermoplastics, thermosets, adhesive, including light curable adhesives, and elastomers and include any additives which tailor the polymer material's properties. Specifically, for example, the tab material may be reinforced with fibers, metal, flakes or other similar particles or my be diluted with fillers or simply air.

A gravure or other print process is used to apply substantial polymer tab or continuous strip material to an engraved cylinder, and then wipe the tab material from the cylinder's surface with a doctor blade, leaving the tab material only in the engraved image areas on the cylinder. Each engraved image area etched into the cylinder, commonly called the print cylinder, creates a depression, the design of which controls the shape, width and thickness of the formed nail tabs.

The process to make the nail tabs or the continuous reinforcing strip is to convey the substrate material and/or the saturated underlayment, roll roofing or shingle material in a continuous process and into contact with an etched cylinder and with sufficient pressure so that the roofing material picks up the tab material left in the depressions on the cylinder while the tab material is in a liquid state and to form tabs of appropriate size and appropriately patterned across the roofing material's surface.

In an alternative, a continuous transfer material is in contact with the etched gravure print cylinder and with the roofing material with sufficient pressure so that the continuous transfer material both picks up the tab material left in the depressions on the print cylinder and transfers the tab material onto the roofing material while the tab material is in a liquid or semi-liquid state and to form tabs or continuous reinforcing strips of appropriate size and appropriately patterned across both the continuous transfer material and the underlayment, roll roofing or shingle material.

In accordance with a preferred embodiment of the invention, there is disclosed a method of making a roofing material, which comprises treating an extended length of substrate roofing material or composite roofing material having the steps of depositing tab material substantially in a liquid state onto the surface of the roofing material at a plurality of locations, the tab material solidifying and bonding to the surface of the roofing material wherein the tab material is deposited on the roofing material by an engraved pattern print roll.

In accordance with another preferred embodiment of the invention, there is disclosed a method of making a roofing material comprising the steps of depositing tab material at a plurality of locations substantially made of a polymer material in a liquid state onto a transfer surface, the transfer surface receiving the tab material for deposition onto the roofing material.

In accordance with another preferred embodiment of the invention, there is disclosed a roofing material, which comprises a substrate roofing material or composite roofing material and tab material substantially made of a polymer material in a liquid state deposited onto the surface of the roofing material at a plurality of locations, the tab material solidifying and adhering to the surface of the base substrate material or saturated or coated material wherein the tab material is deposited on the roofing material by a print roll having an engraved pattern for holding the tab material.

In accordance with another preferred embodiment of the invention, there is disclosed a roofing material, which comprises a base substrate material or a saturated or coated material and a plurality of thermoplastic, thermosetting, adhesive or elastomer tabs deposited onto the surface of the base substrate, saturated or coated material at a plurality of locations, wherein the tabs are deposited on the saturated or coated material by a print roll having an engraved pattern for holding the thermoplastic, thermosetting, adhesive or elastomer tab material.

Other advantages of the present invention will become apparent from the following descriptions, taken in connection with the accompanying drawings, wherein, by way of illustration and example, embodiments of the present invention are disclosed.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE SEVERAL DRAWINGS

Figure 1:
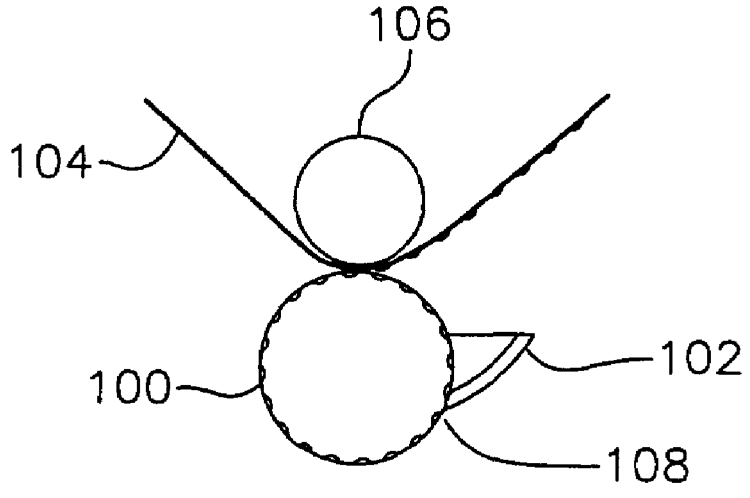
FIG. 1 shows a schematic diagram of a doctor blade and print cylinder according to a preferred embodiment of the invention.

So that the manner in which the above recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the drawings illustrate only a preferred or alternate embodiment of the invention and is therefore not to be considered limiting of its scope as the invention may admit to other equally effective embodiments.

DETAILED DESCRIPTION OF THE PREFERRED EMBODIMENTS

Detailed descriptions of the preferred embodiments are provided herein. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

In accordance with the preferred embodiments of the invention, we disclose several new and useful methods and roofing materials using these methods:

(a) that an improved method in which tabs can be permanently and reliably affixed or bonded to either dry felt, saturated felt, a fiberglass, polyester or other inorganic substrate roofing material whether or not coated with asphalt or an asphalt mix, or roll roofing material or shingles can be automated using an appropriately viscous tab material that quickly solidifies and adheres or bonds to the surface of the roofing material;

(b) that appropriately viscous tab material, in its total or in its part, is substantially, polymer material, specifically including, but not limited to, thermoplastic, thermosetting, hot-melt adhesives, elastomers, and ultra-violet curing materials and is or is not of at least one contrasting color to the roofing material and is mechanically delivered and/or gravity fed to the automation process, although tabs may be composed of other materials using this process;

(c) that the automation process is a gravure, rotogravure, intaglio or gravure-like transfer printing process (the "gravure process"), or an offset printing process, which employs a print cylinder that directly prints an engraved pattern onto the roofing material or onto a continuous transfer material and then presses or laminates that pattern onto the roofing material, in a continuous process which utilizes pressure, whether or not the actual pattern shape survives the use of pressure and the result could be the tab material or continuous strip material appears more evenly distributed on the roofing material;

(d) that the print cylinder is a plate or metal cylinder which has etched or engraved patterns of the same or varying depth, width or shape and which pattern characteristics control the shape, width and thickness of the formed or resultant nail tab, (e) that the engraved pattern is preferably less than or equal to fifty one-thousands of an inch (50/1,000 ths) or 50 mils deep, a circular, continuous strip other geometric, shape approximately 1 to 2-inches in diameter, and consisting of only an outer cell wall or one or more individually etched or cells with distinct cell walls. Patterns as deep as 1 mil up to 100 mils or more may be suitable for certain applications depending on the substrate roofing material and the tab material to be deposited. The inventive method of the present invention is capable of depositing such tab materials and with engraved patterns of such depths;

(f) that the roofing material or the transfer material is preferably in continuous contact with an etched cylinder and with sufficient pressure so that the roofing material or the transfer material picks up the tab material left in the depressions on the cylinder while the tab material is in a liquid state and to form tabs or continuous strips of appropriate size and appropriately patterned across the roofing material surface;

(g) that the continuous transfer material is, most preferably, a continuous belt or coated or covered drum, roll, wheel or other cylindrical or other geometric shape, including a flat level or shaped inclined surface, which has the appropriate surface chemistry characteristics such that its surface has the ability to both accept the appropriate amount of tab material, including but not limited to, a substantially polymer material such as thermoplastic, thermosetting, hot-melt adhesive, elastomer or ultra-violet curing material from the print pattern, under an appropriate amount of pressure, and then to release it onto the substrate or composite roofing material or shingle material, (h) that during the manufacturing of roofing material with nail tabs or continuous reinforcing strips, the continuous transfer material will remain in substantial contact with both the print cylinder and the roofing material at different points, such that the point or points of transfer or lamination of the tab material onto the roofing material will be with an appropriate amount of pressure and with the tab material in either a liquid, semi-liquid or less than fully cured state and of the appropriate size and appropriately patterned across the continuous transfer material; and (i) that the above described invention can be employed directly onto the roofing material, at any point during the manufacture of commercially saleable rolls of saturated felt or tar paper, or other roofing material, including immediately before or after the dipping of the substrate roofing material into the asphalt or asphalt mix tank, or after the manufacturer of any rolled roofing or shingle product.

(j) that the closed applicator or fountain that holds the substantially polymer material is protected mechanically from contamination from the asphalt oils and other impurities that arise from printing on a heated surface covered in asphalt and other materials.

Turning now to FIG. 1, there is shown a schematic side view of the basic gravure method for laying substantially polymer material tabs on the roofing material. A print cylinder 100 receives a viscous tab material into patterns etched into the face of the print cylinder 100 from the print reservoir 102 and prints a pattern onto the roofing material 104, which pattern approximates or equals the etched pattern which on the print cylinder 100. A doctor blade 108 wipes excess tab material from the print cylinder leaving tab material only in the engraved image area etched into the print cylinder 100. Each engraved image area etched into the print cylinder 100 creates a depression, the design of which controls the shape, width and thickness of the formed nail tabs or reinforcing strips. Print cylinder 100 deposits the viscous tab material onto roofing material 104 when said print cylinder 100 and impression cylinder 106 make contact with said roofing material. In a preferred embodiment, roofing material 104 may be comprised of a composite of materials, including the base substrate roofing material (roofing material prior to its saturation or coating with a substantially asphalt or asphalt-mix material), or the final condition underlayment, roll roofing or shingle material. In a process such as described herein, roofing material 104 may be bonded with appropriate rows of nail tabs or continuous reinforcing strips, preferably substantially polymer materials, specifically including but not limited to, thermoplastic-based or thermo-setting material, hot-melt adhesive material, elastomeric material or ultra-violet light curing materials, and may include at least one contrasting color to the roofing material 104 and one or more additives to tailor the polymer material. As is well known in the art, roofing material 104 can be comprised of a substrate roofing material or of a composite roofing material, made starting with a substrate roofing material, including a roll of dry felt, fiberglass, polyester or a combination thereof, mat material. In a preferred method of producing the roofing material in accordance with this invention, the substrate, dry felt or fiberglass and polyester mat material is introduced to the beginning of a continuous and automated process having a system of driven rollers for transporting roofing material 104 through the process. Dry felt or fiberglass mat material undergoes treatment in conventional fashion to impregnate, saturate or otherwise surround or coat the organic or fiberglass and polyester mat fibers with asphalt to produce an asphalt saturated felt, mat or substrate material.

There are four basic components to the gravure or offset processes unit: an engraved print cylinder, the tab material fountain, including the hot bar assembly and the heated knife assembly, the doctor blade and the impression roll. Additionally, the design of the engraved pattern and the composition of the tab material are also important. In the second embodiment, two additional components are basic: the surface and composition of the continuous transfer material and the press rolls or lamination equipment.

The gravure process is a type of intaglio process in which an actual image is etched into the surface of a plate or metal cylinder. When the cylinder is rotated in or up against a fountain of suitable and appropriately viscous tab material, the tab material goes into the etched image in the cylinder and the excess tab material in the non-image area of the plate or cylinder is removed by a scraper blade, commonly called a "doctor blade." The size, depth and shape of each pattern etched as an image on the plate or cylinder determines how much tab material will ultimately be deposited on the roofing material, as well as the ultimate shape of the deposited tab material. When the roofing material or the continuous transfer material is passed between the plate or cylinder with the engraved pattern, commonly called the "print cylinder," and another cylinder, commonly called the "impression roll," the roofing material or transfer material acts like a blotter and absorbs the appropriate amount of tab material from each engraved pattern. In the preferred embodiment, the impression roll is covered in a material which allows depressions into its surface, oftentimes a rubber or rubber-like covering is utilized. This covering allows either the roofing material, which would pass between the print and impression cylinders, or the transfer surface itself to be pressed into the etched image on the print cylinder and pick up the tab material in the etched image on the print cylinder. The hardness of this covering can, in part, determine how much tab material is transferred to the roofing material. At the point of contact the tab material is drawn out of the engraved pattern and onto the roofing material or transfer material by capillary action. The roofing material or transfer material is brought into contact with the print cylinder with the help of the impression roll and an appropriate amount of pressure mechanically created between the two rolls.

Figure 1B:
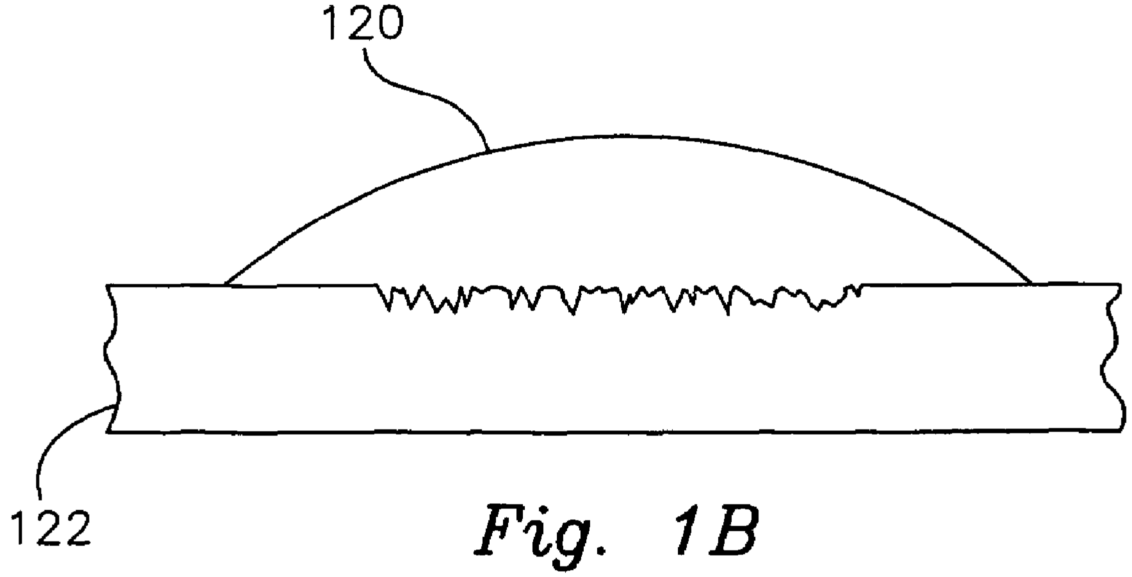
FIG. 1B shows cross section of a portion of roofing material and tab material according to a preferred embodiment of the invention.
Figure 1A:
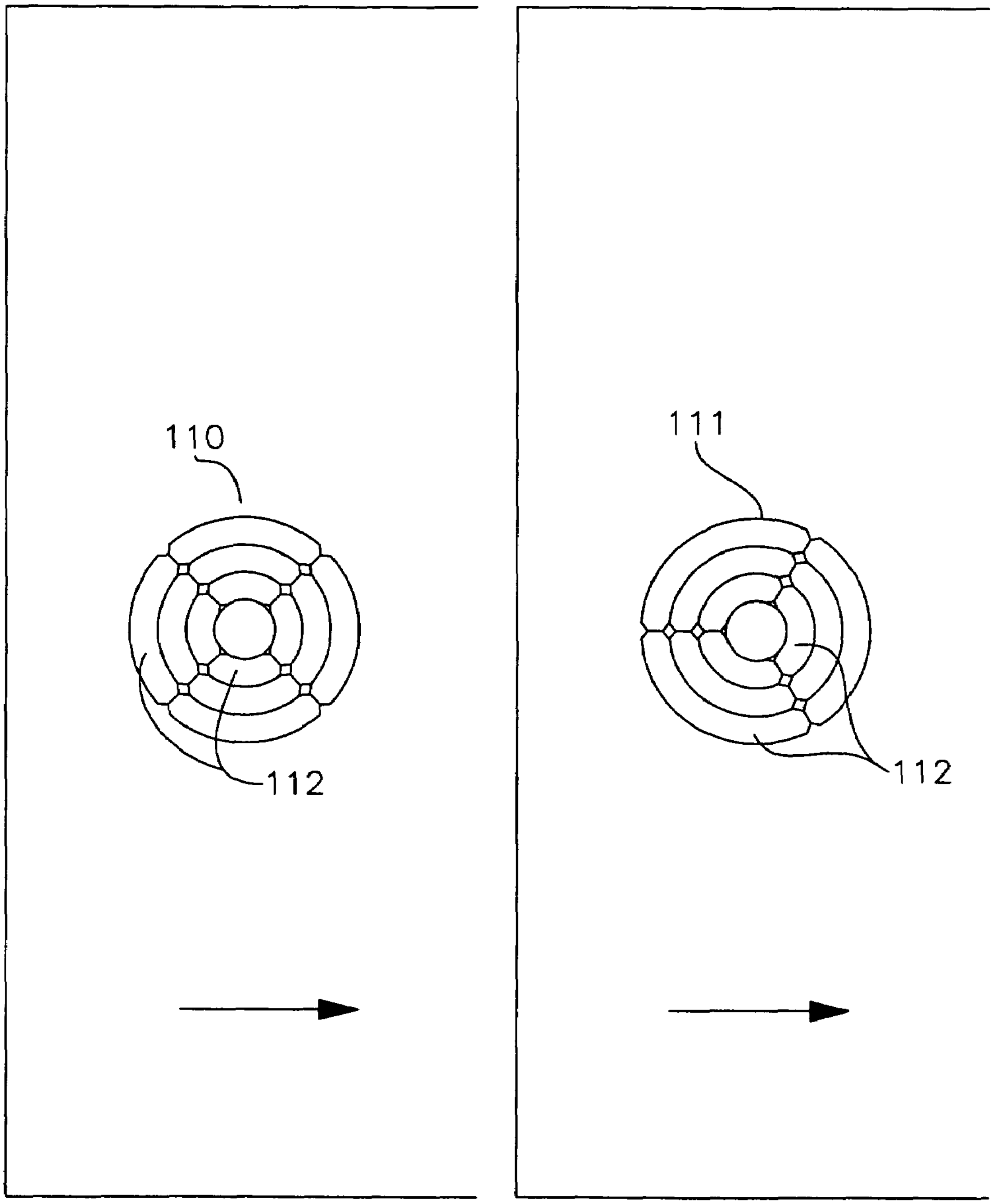
FIG. 1A shows a plan view of two alternative etched patterns for a print roll according to a preferred embodiment of the invention.

FIG. 1A shows a top plan view of two etched patterns 110 and 111 which can be used to deliver the desired amount of tab material directly to the roofing material or to the transfer material. Etched patterns 110 and 111 can be of a variety of shapes or sizes, and may have internal depressions, protrusions and the like. For example, the etched pattern may be a depressed cylindrical shape, with no internal features, any number of cell wall divisions, or have a pattern at the base of the cylindrical shape such as tetrahedral, pyramidal or spike protrusions which would act to hold the polymer tab material in the etched or depressed pattern until the tab material is delivered to the roofing material or transfer material. In a preferred embodiment shown, the patterns are primarily clear or consist of a plurality of small open areas 112 which allows a precise amount of the viscous tab material to be applied to the roofing material and adhere to said roofing material hardening into the desired shape and thickness. These small open areas may be either continuous or self-contained.

FIG. 1B is a side view of the tab material 120 as it resides on top of the roofing material 122 after being deposited by a circular clear or open pattern. The tab material 120 can be substantially comprised of polymer material, including, but not limited to, thermo-plastic, thermo-setting, hot-melt adhesive, elastomeric or ultra-violet light curing material, and can include materials of contrasting color to the roofing material or any other materials which tailor the primary polymer material's properties. Tab material 120 used or applied in the print methodologies, described herein, to form nail tabs or continuous reinforcing strips or other regions on the roofing materials can be comprised of substantially polymer materials. Tab materials 120 are affixed to the roofing material through any of the printing processes described herein.

Figure 2:
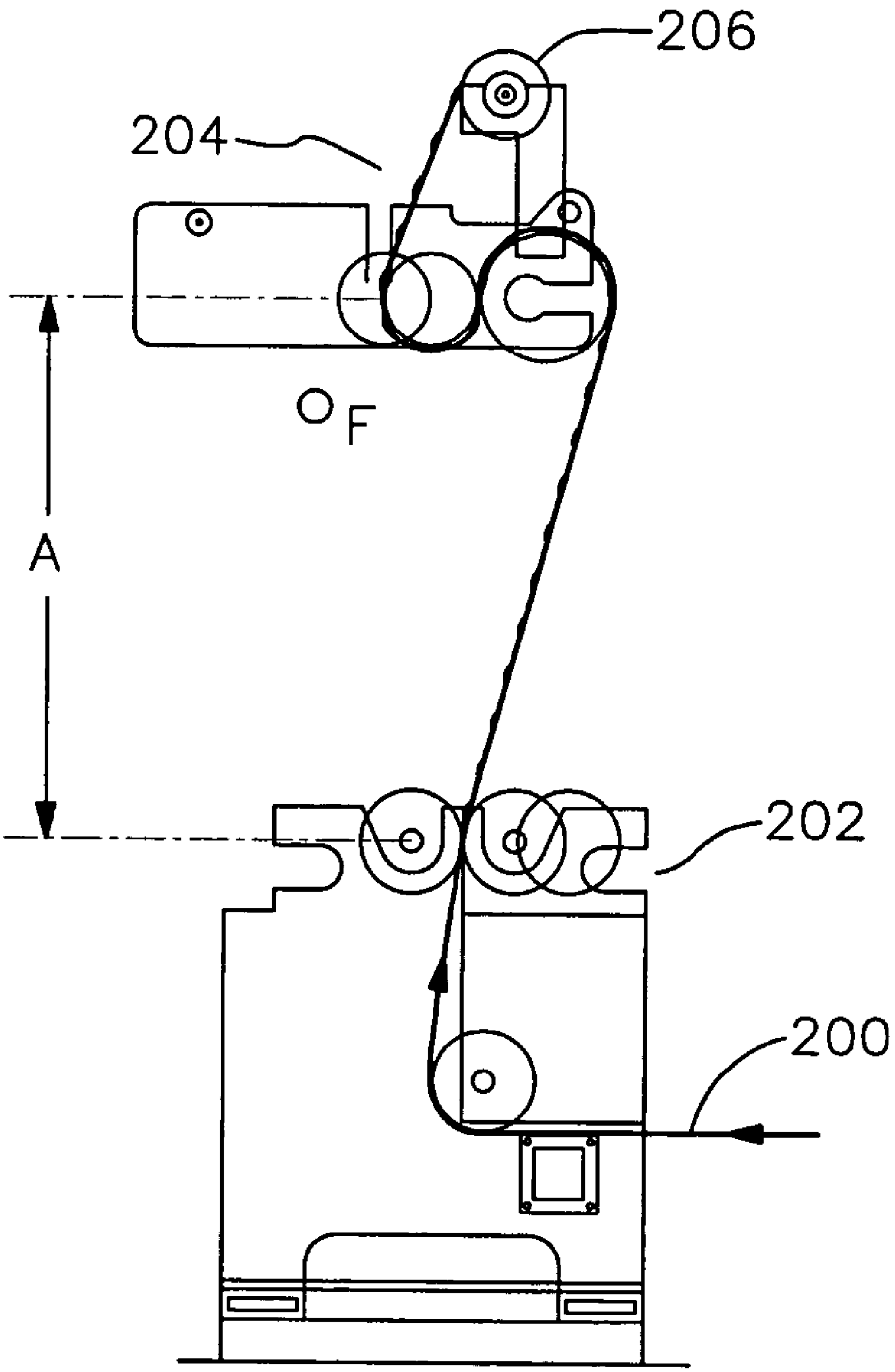
FIG. 2 shows a schematic diagram of gravure print apparatus according to a preferred embodiment of the invention.

FIG. 2 shows a side view of the gravure process print module 202 and press role module 204 directly printing the tab material onto the roofing material 200. Tab material could be printed in discreet tabs, intermittent or continuous strips which result in a reinforcement of the roofing material 200. Roofing material 200 is then assembled into rolls 206 (or could continue forward into the machine's finish looper, etc., which is not shown), as shown in the press rolls module 204. However, in the preferred embodiment, these modules are inserted into an existing asphalt roofing machine which accomplishes the actual winding of the finished roll or stacking of the shingles.

Figure 3:
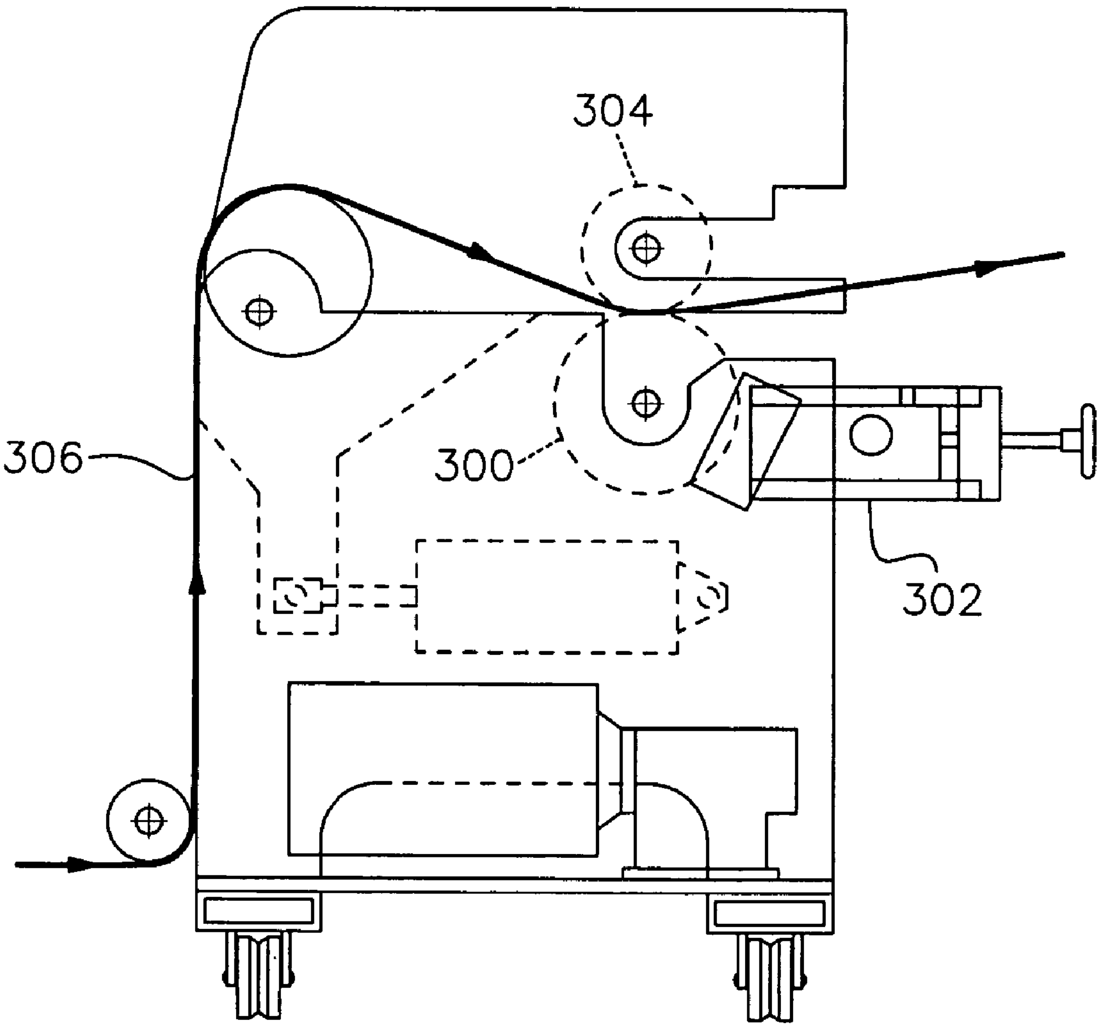
FIG. 3 shows a side view of a gravure print apparatus according to a preferred embodiment of the invention.

FIG. 3 is a schematic side view of a print module according to a preferred embodiment of the invention. Although the actual configuration, web path, roll placement, etc. may vary, this is one preferred embodiment where the print cylinder 300 is pressed against the impression cylinder 304. Print cylinder 300 receives an appropriately viscous tab material from the print reservoir 302 and prints an engraved pattern onto the roofing material 306. Print cylinder 300 deposits the viscous tab material onto roofing material 306 when said print cylinder 300 and impression cylinder 304 make contact with roofing material 306.

Figure 4:
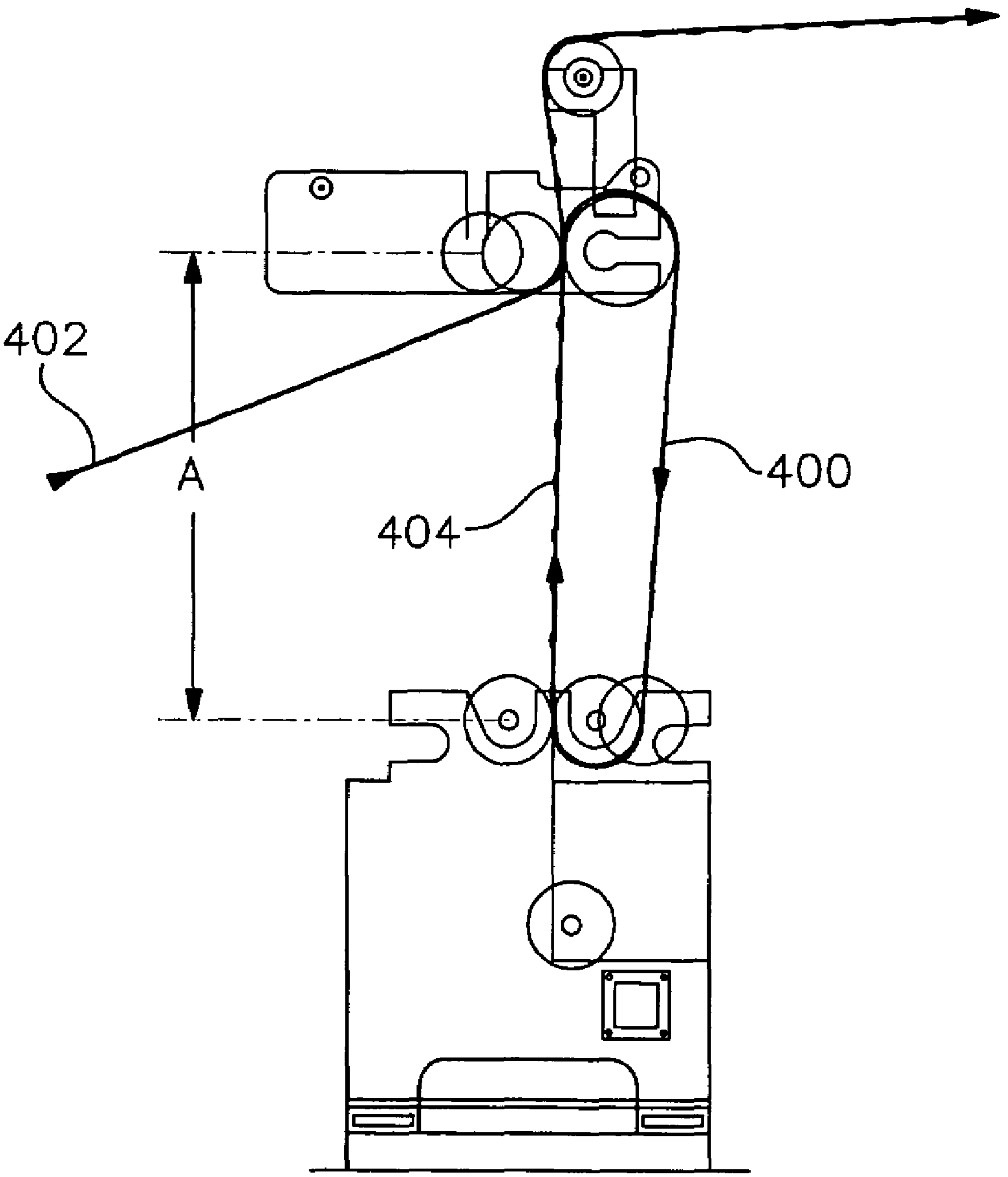
FIG. 4 shows a schematic of a gravure print transfer process according to a preferred embodiment of the invention.

FIG. 4 is a schematic side view of the alternate embodiment of the print methodology utilizing an offset print process or transfer belt 400 to affix tab material 404 onto the roofing material 402. The transfer belt 400 mechanism is shown attached to, wrapped around, the impression roll of the print module, with the print roll pressed against the belt to deliver the tab material, with the other end of the transfer belt wrapped around one of the rolls in the press module. As previously disclosed the continuous transfer material is, preferably, a continuous transfer belt 400 or coated or covered drum, roll, wheel or other cylindrical or other geometric shape, including a flat level or shaped inclined surface, which has the appropriate surface chemistry characteristics such that its surface has the ability to both accept the appropriate amount of tab material 404, from the print pattern, under an appropriate amount of pressure, and then to release it onto the roofing material 402. Roofing material 402 is understood to include, but not limited to, substrate roofing or composite roofing material or shingle material.

Figure 4A:
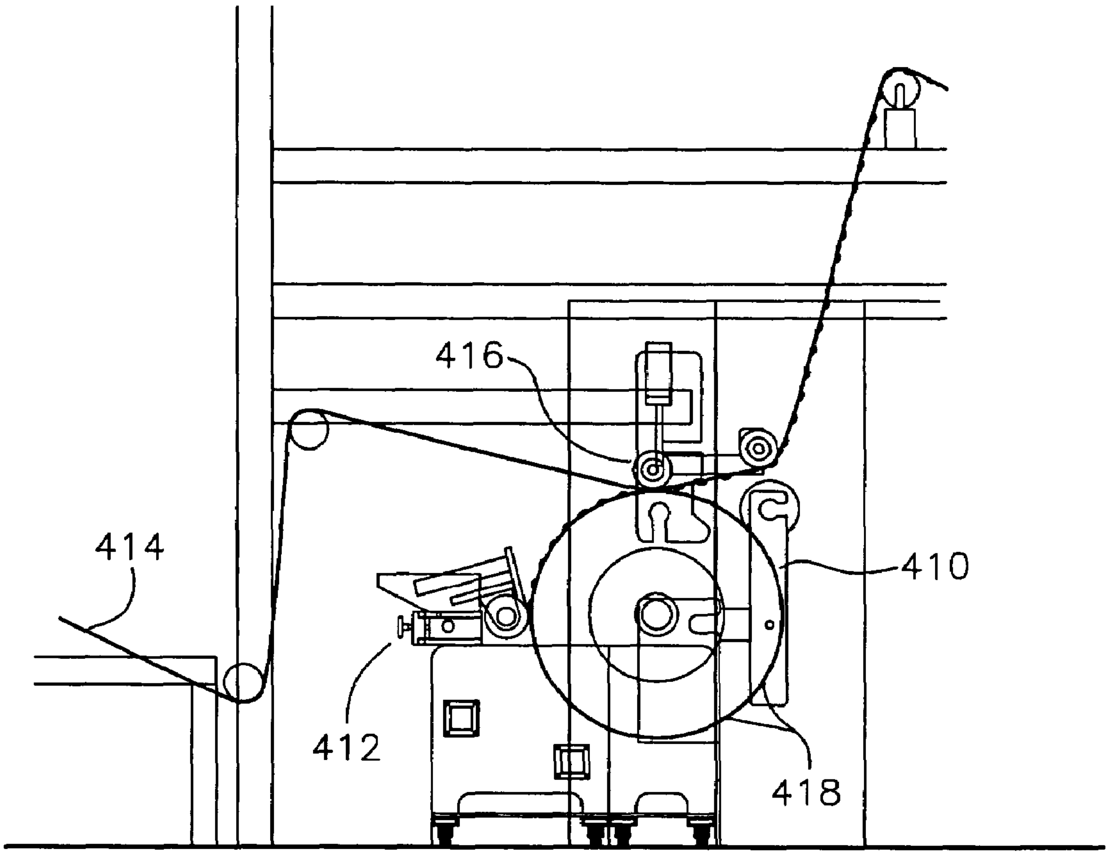
FIG. 4A shows a schematic diagram of a gravure print transfer process with a drum, roll, or wheel.

FIG. 4A is a side view of the alternate embodiment utilizing the transfer material as a coating or covering on a transfer surface 410 in the cylindrical shape, such as a single drum, roll(s) or wheels. Transfer surface 410 receives an appropriately viscous tab material 418 from the print mechanism, reservoir 412 and prints an engraved pattern onto the roofing material 414 during contact with the transfer surface 410 and the impression cylinder 416. In this embodiment, more than one impression cylinder may be used. While this figure shows transfer surface 410 in the cylindrical shape, any other shape surfaces could be used which hold roofing material 414 against the tab material 418 while the tab material 418 is in contact with the transfer surface 410.

In this embodiment, the continuous transfer material is, preferably, a continuous seamless belt or coated cylinder or other appropriately covered or coated flat or geometric shape. The surface of the belt, coated cylinder or other covered surface shape has the appropriate surface chemistry characteristics to both accept and release the tab material quickly, typically before one complete revolution of either material or before the roofing material moves off of the transfer surface. A typical revolution is the cycle between the transfer surface accepting a deposit of the tab material and subsequently releasing the tab material. The transfer material's surface must attract the appropriate amount of tab material from the engraved pattern upon its contact with the print cylinder. The transfer material's surface must also release primarily all of the desired amount of tab material it attracts from the print cylinder onto the roofing material. During the tab materials contact with both the transfer material and the roofing material, the tab material is held via a press or lamination process. The roofing material is held in contact with the tab material while the tab material is in contact with the transfer material with one or more cylinders or other appropriate flat or other geometric shape and an appropriate amount of pressure. The press or lamination process occurs before the tab material is fully cured and while the tab material is in a liquid or semi-liquid state. At the appropriate moment, either before or after the polymer tab material is cured, the roofing material web path separates from the transfer material's surface.

All of the components, basic or otherwise, in the gravure process or in the alternate embodiments of the gravure process, the gravure-like transfer printing process or the offset process, are coordinated with the operations of the existing saturation line equipment. Further, additional coatings or materials may be applied after the deposition of the tab material such as ink-based insignia or logos printed on top of the tab material at desired locations.

The tab material may include only one or a combination of the following: polymer materials, including, but not limited to, thermoplastics, thermosetting, hot-melt adhesives, elastomers, ultra-violet or other light curing materials, a colored material or any other additive materials to tailor the polymer materials. The tab material may be reinforced with fibers, metal, flakes or other similar particles, may be diluted with fillers or air, and such tab material may also include a color contrasting dye to that of the underlying saturated or coated roofing material, which is normally black. The term "tab material" would include what is described herein. Even without an added dye, however, the resultant nail tabs may contrast in color and appear readily visible.

By the time the roofing material with tabs reaches a "finished and/or free looper" or finished roll winder stage in the typical saturation or rolled roofing manufacturing process or the shingle cutting or packaging stage in a typical shingle manufacturing line, the tab material and/or other component materials of the tab or continuous reinforcing strips are sufficiently cooled and hardened to not adversely effect the operational conditions of the manufacturing line equipment. That is, they are tough, but flexible and if tacky, only slightly tacky.

Figure 5:
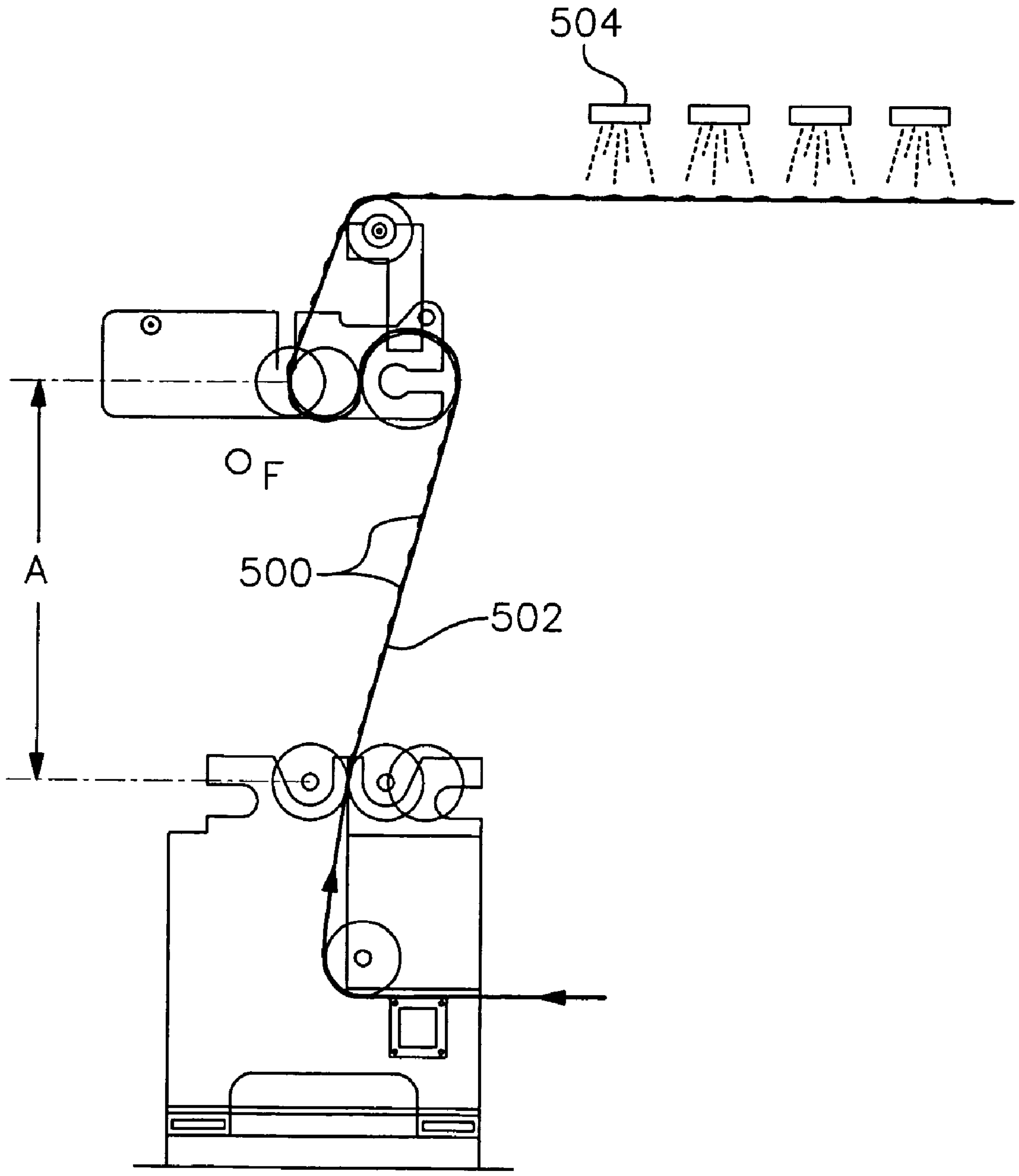
FIG. 5 shows a side view of a gravure print process with ultra violet or other light curable process.

FIG. 5 is a schematic side view of the ultra violet or other light curable process. Viscous polymer tab material 500 specifically including, but not limited to, thermoplastics, thermo sets and elastomers, any of which can be cured to a hardened state by ultraviolet or other light curable processes, and any additives which tailor the substantially polymer material's properties. Polymer materials such as adhesive materials including liquid adhesive, hot-setting adhesive and light curable material may also be used as tab material 500. Tab material is printed onto roofing material 502 as discussed herein then cured or dried with ultra violet or other light curable processes or methods as is well known in the art. A light 504 or series of lights delivers the ultra violet or light curing to the roofing material 502 hardening tab material 500.

Figure 6:
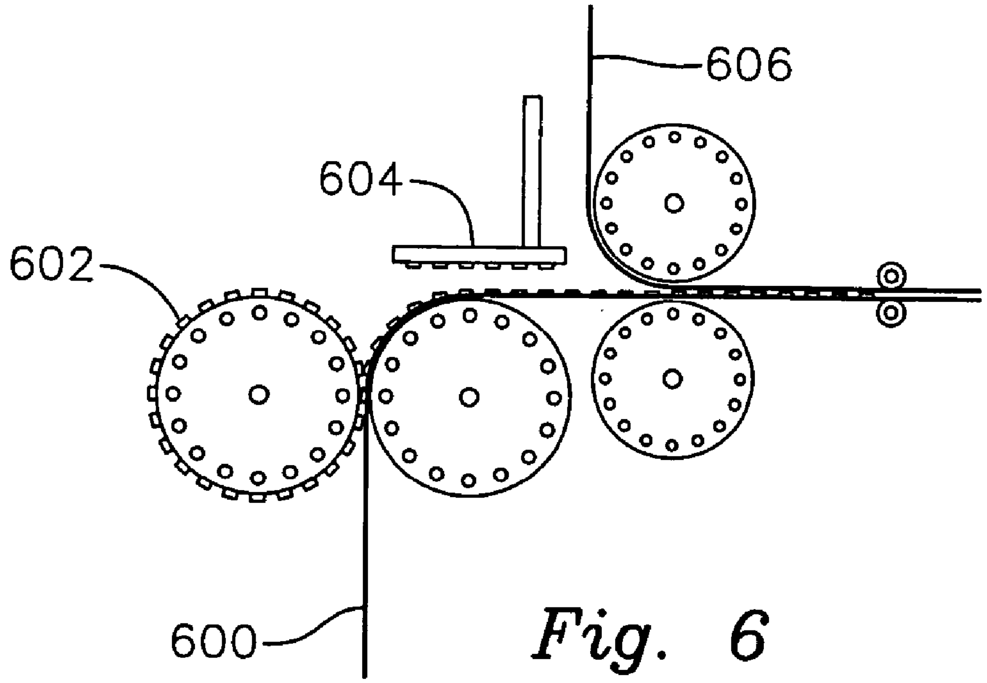
FIG. 6 shows a side view of tab material being printed on a transfer surface or being laminated directly onto the roofing material.

FIG. 6 is a side view of the tab material being printed onto a transfer surface 600. The transfer surface 600 is either disposable, such as in a pure on-line lamination usage, or used in a continuous loop, as in a belt or cylinder covering. The transfer surface receives the tab material from the print cylinder 602. In the embodiment shown a heating mechanism 604 is used to keep the tab material liquid or soft, i.e. to retard curing until the press/lamination. Roofing material 606 is laminated or pressed with the transfer surface to move the tab material onto the roofing material 606.

Figure 7A:
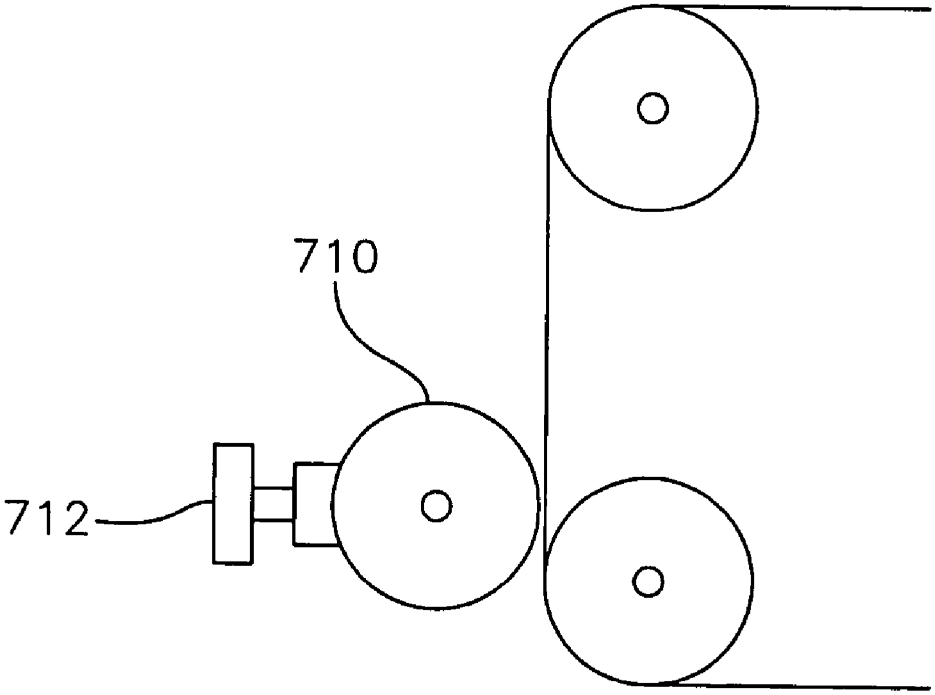
FIG. 7A shows a side view of a gravure printing apparatus according to a preferred embodiment of the invention.

FIG. 7A shows a side view of the print cylinder 710 in contact with the tab material applicator 712, with the print cylinder 710 and applicator 712 shaped so as to deposit viscous tab material only inside the depressions within the print cylinder formed by the etched patterns. The tab material applicator 712 is pressed up against the print cylinder and has a continuous flow of tab material available and applied against a raised portion of said cylinder that carries the etched patterns.

Figure 7B:
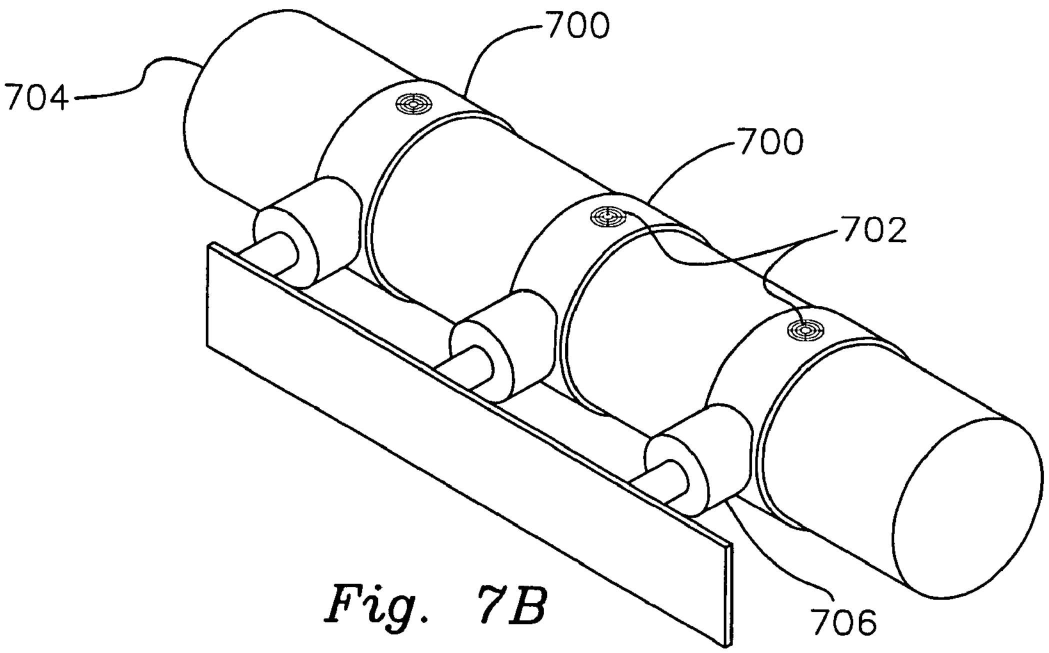
FIG. 7B shows a perspective view of print cylinder with raised lanes, in which the pattern is engraved, and pressurized delivery system according to a preferred embodiment of the invention.

FIG. 7B shows a perspective view of the print cylinder and tab material delivery mechanism of a preferred embodiment of the invention. Print cylinder 704 has a plurality of raised sections 700 which are situated on and above the base circumference of the print cylinder. The raised portions have etched patterns 702 (previously disclosed in FIG. 1A and shown in their preferred embodiments) which are positioned in the middle of the raised portions and are in contact with the tab material delivery mechanism or tab material applicators 706. The applicators or fountainheads are positioned in tight conformity with the print cylinder to minimize contamination of the tab material with asphalt oils and other contaminants that are associated with the roofing material. The applicators may or may not overlap the raised portions of the print cylinder. In the preferred embodiment, the applicators overlap the raised portions of the print cylinder to aid in keeping the liquid tab material from oozing out. However, this appears to be a function of the accuracy of the machining of the two parts: the print cylinder and the applicators. Etched patterns 702 receive an appropriately viscous tab material from the applicators 706 under pressure. The applicators are configured to fit the curvature of the print cylinder and thereby only apply tab material into the etched pattern when the pattern is directly in line with the applicator. The applicator then delivers adhesive to the pattern which in turn rotates into contact with the roofing material web as shown in FIG. 7A. As the roofing material comes into contact with the etched pattern, the substantially polymer tab material is pulled out of the pattern depression and deposited onto the roofing material in recurring fashion creating a series of tabs or continuous strips on the roofing material.

Applicators 706 and their associated mechanical supports may be heated by any available means such as electrical cartridge heaters, hot-oil heat exchange or the like. Substantially polymer material may be ported to any place into the applicator or fountainhead to deliver tab material to the etched patterns. Said applicators can be any shape with or without integral doctor blades.

Figure 8A:
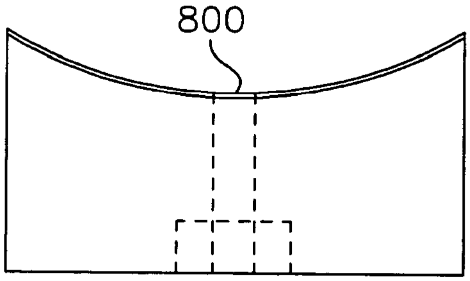
FIG. 8A shows a cross sectional side view of a tab material delivery mechanism according to a preferred embodiment of the invention.
Figure 8B:
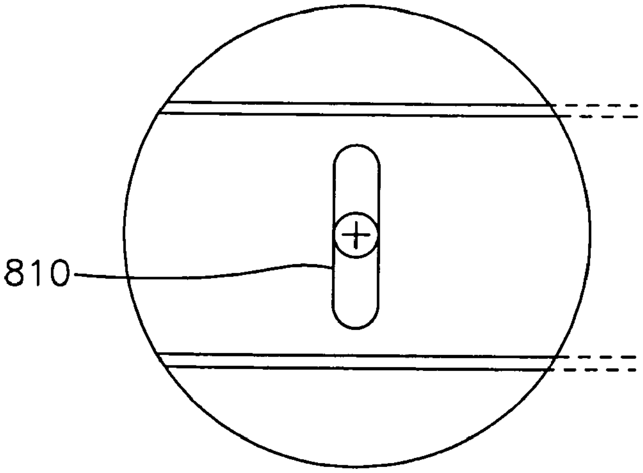
FIG. 8B shows a top plan view of a tab material delivery mechanism according to a preferred embodiment of the invention.

FIG. 8 is a cross section view of a applicator comprised of a concave surface matching the curvature of the raised sections of the print cylinder as described in FIG. 7. A delivery channel 800 delivers the viscous tab material from the applicator that is in fluid communication with the channel. Tab material is under constant and steady pressure from the back of the applicator and applies material through the channel and into the etched patterns.

The applicator or "fountainhead" for delivering the substantially polymer tab material mates closely to the print cylinder for the purposes of transferring the said tab material to a web of roofing material. The retention volume of the fountainhead may be minimized to aid in delivering substantially uncontaminated tab material to the print roll or print cylinder. The "retention volume" refers to the effective volume that may become contaminated by convective or diffusive mixing with roofing material contaminants and oils involved in the process.

FIG. 8A is a top plan view of the tab material applicator according to a preferred embodiment of the invention. The center portion of the concave surface of the applicator rides on the raised section of the print cylinder as shown in FIG. 7B. The applicator or fountainhead is closed on all sides mating to the print cylinder such that it forms a moving or rotary seal to the print cylinder. The leading edge of the fountainhead (edge opposing the direction of motion of the print cylinder) sheds asphalt oils and other contaminates which may emanate from the roofing material and/or transfer from the print cylinder. The fountainhead or tab material delivery system almost entirely envelops the raised portion of the rotating print cylinder such that the tab material delivered is further protected from contamination. The delivery channel center bore 810 allows viscous tab material to flow and be deposited on the etched patterns on the raised sections of the print cylinder only when the applicator is in direct contact with the etched pattern. Although a small portion of the tab material may escape from the sides of the applicator as it is pressed up against the print cylinder, the vast majority of the tab material is deposited into the etched patterns on the print cylinder and subsequently deposited onto the roofing material. Further, having a tight conformance of the applicator to the raised portion of the print cylinder minimizes contamination of the tab material by asphalt oils and other undesirable contaminants from the roofing material.

Figure 9:
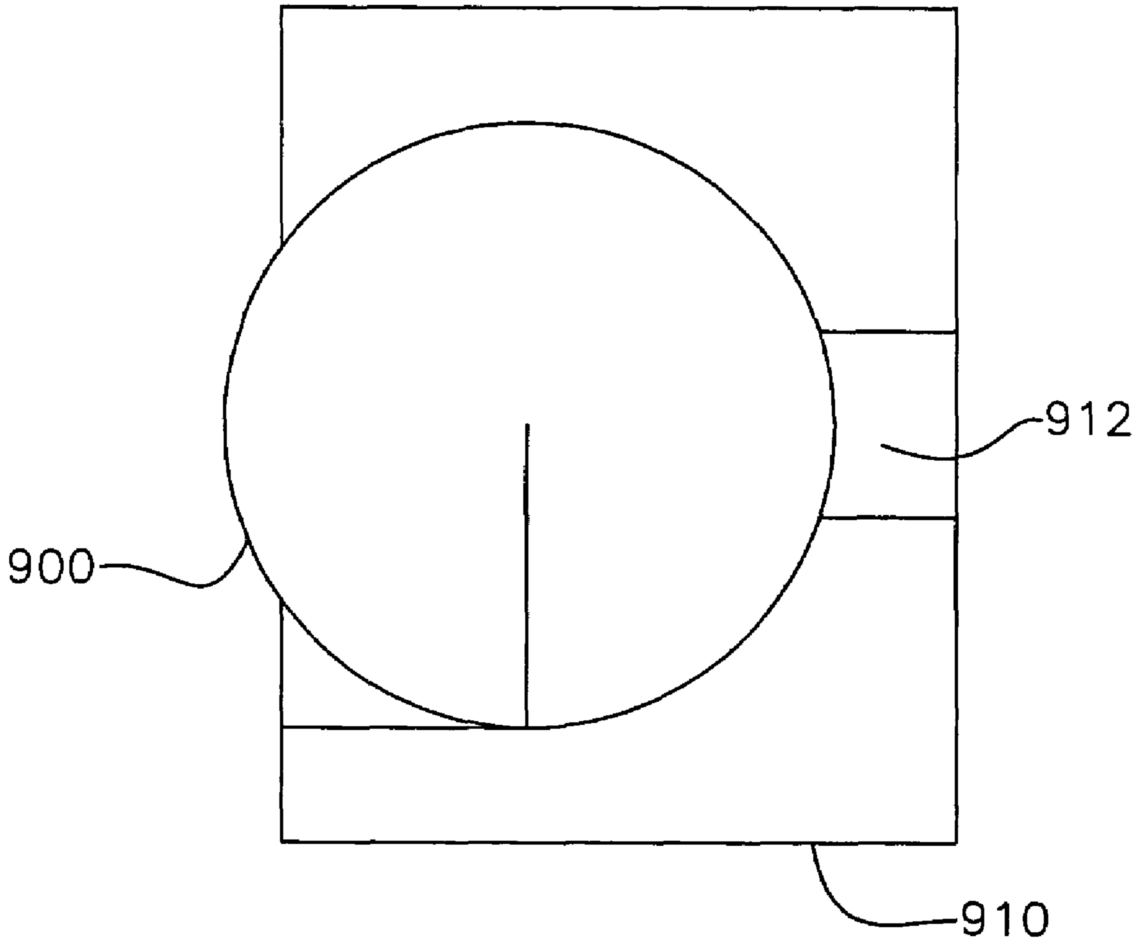
FIG. 9 shows a cross sectional side view of an alternative tab material delivery and print roll mechanism according to a preferred embodiment of the invention.

FIG. 9 shows an alternative embodiment where a fountainhead or tab material delivery system substantially entirely envelops the rotating print cylinder such that the tab material that is ultimately delivered to the roofing material is further protected from contamination. Fountainhead block 910 is configured to conform to the outer circumference of print cylinder 900. Fountainhead block 910 may run the length of print cylinder 900 or in a preferred embodiment individual blocks would be positioned for each line of tabs or continuous strips. For example, if there are three rows of tabs being applied by the print cylinder to the roofing material, there would be three fountainhead blocks each delivering tab material to the etched pattern on the cylinder. Applicator 912 is positioned against the print cylinder to deliver tab material to the print cylinder etched patterns. It may be either a reservoir or the type of pressurized delivery system as previously described. The exposed side of print cylinder 900 is pressed up against the roofing material upon which the etched pattern in the print cylinder deposits tab material as described earlier. By enclosing the print cylinder in this manner, contamination of the tab material is reduced. The print cylinder can be actively driven by a motor or passively driven by the moving roofing material (web) sheet.

In an alternative embodiment, the tab material may be delivered through injection from within the print cylinder itself. The tab material would be injected into the center of the print cylinder and then delivered through individual ports corresponding to the locations at which deposition of tabs or continuous strips was desired. The tab material would be under pressure and through pipes and nozzles preferably heated and applied to the roofing material through locations on the print cylinder corresponding to the tab or strip locations.

As mentioned, the final resulting roofing material products, with nail tabs or continuous reinforcing strips, just described are manufactured using a machine that includes one or more of the basic gravure printing process or gravure-like transfer printing process or offset process components. The liquid or semi-liquid tab material, or equivalent material, is normally supplied to the roofing material or transfer material in a single print and/or single press or lamination process; however, multiple passes with the same or differing tab materials, pressures, etched patterns or other materials comprising the resultant formed tab may be employed in the gravure process or offset process.

The gravure process or offset process equipment can also be engaged or disengaged by the operator without materially affecting the continuous process of the asphalt roofing manufacturing line equipment.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A roofing or building cover material, which comprises a substrate roofing material or composite roofing material and tab material in a liquid state deposited through capillary action onto the surface of said roofing or building cover material in a plurality of nail tabs, said tab material solidifying and adhering to the surface of said material wherein said material is deposited on said roofing material by a print roll having an engraved pattern for holding said tab material.

2. A roofing or building cover material in accordance with claim 1, wherein said tab material contains ultra-violet or visible light curing polymers.

3. A roofing or building cover material, which comprises a base substrate material or a saturated or coated material and a plurality of thermoplastic, thermosetting, adhesive or elastomer tabs pressure adhered onto the surface of the base substrate, saturated or coated material in a plurality of nail tabs, wherein said tabs are deposited on said saturated or coated material by a print roll having an engraved pattern for holding said thermoplastic, thermosetting, adhesive or elastomer tab material.

4. A roofing or building cover material in accordance with claim 3 wherein said thermoplastic, thermosetting, adhesive or elastomer is introduced to said engraved pattern through a pressurized applicator.

5. A roofing or building cover material in accordance with claim 3 wherein said print roll has a circumferential raised portion upon which said engraved pattern is located.

6. A roofing or building cover material in accordance with claim 5 wherein said applicator is positioned against said raised portion to supply said engraved pattern with thermoplastic, thermosetting, adhesive or elastomer material.

7. A roofing or building cover material in accordance with claim 3 further comprising an applicator for delivering said thermoplastic, thermosetting, adhesive or elastomer that maintains a tight seal against said print roll.

* * * * *